United States Patent [19]

Adamse et al.

[11] 4,456,648

[45] Jun. 26, 1984

[54] PARTICULATE-MODIFIED ELECTRET FIBERS

[75] Inventors: Jan W. C. Adamse, Hellevoetsluis; Jan Van Turnhout, Pijnacker, both of Netherlands

[73] Assignee: Minnesota Mining and Manufacturing Company, St. Paul, Minn.

[21] Appl. No.: 530,778

[22] Filed: Sep. 9, 1983

[51] Int. Cl.³ .............................................. B32B 5/16
[52] U.S. Cl. .................................... 428/283; 428/288; 428/921
[58] Field of Search ...................... 428/283, 288, 921; 264/DIG. 47, DIG. 48

[56] References Cited

U.S. PATENT DOCUMENTS

Re. 30,782  10/1981  Van Turnhout ........... 264/DIG. 47
Re. 31,285   6/1983  Van Turnhout et al. .......... 428/369
4,147,636    4/1979  Drake et al. ........................ 428/921

*Primary Examiner*—James J. Bell
*Attorney, Agent, or Firm*—Donald M. Sell; James A. Smith; Roger R. Tamte

[57] ABSTRACT

Fibrous web electrets are given added properties through inclusion of a particulate material, such as a flame-retardant agent, in less than all the layers of a plural-layer film from which fibers are fibrillated, and by use of a brominated derivative of bisphenol A as the flame-retardant agent.

7 Claims, 1 Drawing Figure

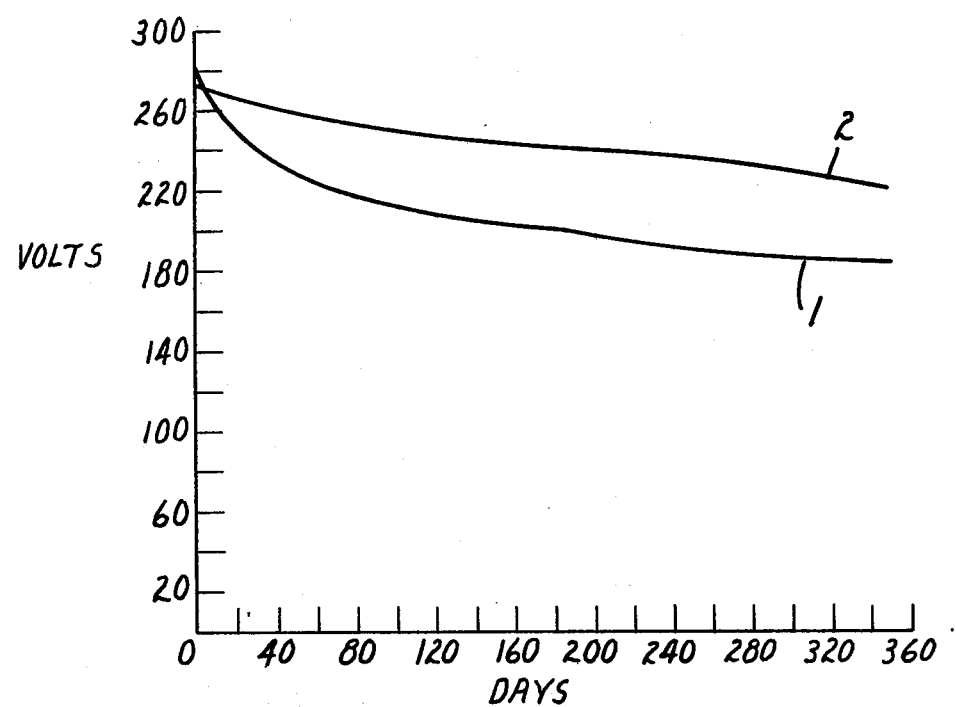

PARTICULATE-MODIFIED ELECTRET FIBERS

BACKGROUND OF THE INVENTION

U.S. Pat. Re. No. 30,782 discloses unique fibrous webs, and unique methods for preparing fibrous webs, that carry a persistent electric charge. These methods involve fibrillating an electrically charged film and collecting the fibers into persistently charged webs that have special value as filters and for other purposes.

These unique webs would have further value if they were flame-retardant as well as electrically charged. However the conventional addition of a particulate flame-retardant agent into the film to be fibrillated makes a less persistently charged product. Maintenance of a persistent charge requires that the film be electrically insulating, but particulate additives such as flame-retardant agents tend to be electrically conducting and to take away the necessary electrically insulating state. In general this problem arises with the addition of any particulate material to the electrically charged fibrous webs, such as coloring pigments, anti-oxidants, stabilizers against ultraviolet light, and particles that make the film more readily fibrillated.

SUMMARY OF THE INVENTION

The present invention provides new fibrous webs, and methods for making such webs, which are both persistently electrically charged and include particulate additives such as flame-retardant agents. Briefly, a new web of the invention comprises fibers fibrillated from a film comprising two or more layers, one of said layers comprising a polymeric material substantially free of particulate matter, and another layer including particulate matter which potentially increases the conductivity of that layer. The particulate matter generally has an average diameter that is smaller than the thickness of the layer in which it is incorporated. It has been found that such a web shows only a small decline in electric charge, even when subjected to conditions of elevated temperature and high relative humidity, apparently at least in part because the layer in the fibers that is free of particulate matter maintains good electret properties. While that layer is free of particulate material such as a flame-retardant agent, the presence of flame-retardant agent in a second layer that is contiguous with the particle-free layer provides flame-retardancy for the whole layered fiber, and for a web made of those fibers.

As a further aspect of the invention it has been found that a particular class of flame-retardant agents, namely brominated derivatives of bisphenol A, especially contribute to flame-retardancy while maintaining persistence of electric charge. In fact, these flame-retardant agents maintain a good combination of persistent charge and flame-retardant properties even when incorporated into single-layer fibrillated-film fibers, though plural-layer fibers as described above are preferred, and though lower amounts of the agent are preferably used in a monolayer-film product that are used in the plural-layer-film product.

DESCRIPTION OF THE DRAWING

The drawing presents test results showing the retention of electric charge by products of the invention.

DETAILED DESCRIPTION

A fibrous web of the invention can be prepared in the general manner described in U.S. Pat. Re. No. 30,782 and U.S. Pat. Re. No. 31,285. That is, starting materials are formed into a film, in this invention, a plural-layer film, and the film is electrically charged and then fibrillated into fibers, which are assembled together as a fibrous web. The starting material for the plural layers comprises a nonpolar film-forming polymeric material, with particulate matter being added in accordance with this invention to one or a limited number of the layers. At least one of the layers is free from particulate matter.

U.S. Pat. Re. No. 31,285 describes fibrillation of plural layer films. Such films are conveniently made, for example, by presenting layers of different polymeric materials to a common extrusion nozzle, whereupon the materials are extruded as a multilayer film.

The particulate materials added to the polymeric material should have a small size in order to enhance the dispersion of the particulate material. The particulate materials should be much smaller than the thickness of the layer in which they are dispersed, preferably an order of magnitude smaller.

The invention offers the ability to incorporate a variety of agents in particulate form into fibrillated-film fibrous webs but the invention is particularly useful with flame-retardant agents which offer flame-retardancy for the web. A preferred flame-retardant material is described in U.S. Pat. No. 4,147,636, which is incorporated herein by reference. Flame-retardant agents as taught in that patent are sold by Sandoz Limited under the tradename SANDOFLAM 5070 and have a brominated bisphenol A active agent. This flame-retardant agent is sold in masterbatch form, i.e., with the active flame-retardant agent in a carrier such as polyethylene. Preferably the material added accounts for less than about ten percent by weight of the whole fiber, and preferably less than about 5 percent.

Other agents which may be added to fibrous webs of the invention are coloring pigments, anti-oxidants, stabilizers to ultraviolet light, and particles that improve the fibrillation of the film.

The film may comprise more than two layers, with at least one of the layers being free of particulate material. For example, a film may be extruded that comprises two particle-containing layers on each side of an inner layer that is free of particulate material. Alternatively, two layers free of particulate material may be extruded on either side of an inner layer that contains particulate material.

Polypropylenes are especially desirable nonpolar polymeric materials because they have good electrical insulating properties and can be economically and conveniently fibrillated into fibrous webs. It is desirable to mix the particulate material into a high-melt-index polypropylene, since such a material allows a better dispersion of the flame-retardant particles into the polymer.

The invention will be further illustrated by the following example. A film was prepared comprising a first 5-micrometer-thick layer of a polypropylene having a melt index of 15 grams per 10 minutes and containing per 100 parts of polypropylene 8 parts of a masterbatch of particulate flame-retardant agent comprising as the active ingredient 2,2-bis[3,5-dibromo-4-(2,3-dibromopropoxyphenyl)] propane; the masterbatch comprised 65 weight-percent active substance in a low-density polyethylene carrier having a melt-flow index of about 17 (Sandoflam 5070 supplied by Sandoz Limited, Basel, Switzerland). The film also included a second 5-micrometer-thick layer comprising polypropylene having a melt index of 2.5 grams per 10 minutes (since the particle-containing and particle-free layers were equal in volume, the masterbatch averaged 4 percent by weight of the whole film). The film was stretched in the length direction to 6.5 times its original length, and was electrically charged in the manner described in U.S. Pat. Re. No. 30,782 using a direct current charging device with electric wires maintained at 6000 volts on one side of the film and minus 6000 volts on the other side of the film. The film was fibrillated with a needle roller to give fibers of approximately 10 micrometers thickness and averaging 45 micrometers in width. The fibrillated fibers were collected as two fibrous webs, one (Sample A) having a basis weight of 233 grams per square meter and the other (Sample B), 186 grams per square meter. As a control an identical fibrous web was prepared except that no flame-retardant agent was included in the high-melt-index layer. Standard tests were performed on the webs for sodium chloride penetration and it was found that Sample A allowed a penetration of 1% and Sample B a penetration of 1.8%, while the control exhibited a penetration of 1.6%. Pressure drop through the samples was 28 pascals for Sample A,, 21 pascals for Sample B, and 21 pascals for the control.

Samples of the charged film prior to fibrillation were tested for maintenance of charge under conditions of 45° C. and 100% relative humidity with results as shown in the drawing. The charge on the films was measured in volts using an electrostatic volt meter, Model 236, supplied by Monroe Electronics Inc., Lydonville, N.Y. The charge tended to be slightly higher on the particle-free side of the film; the measurements on each side were averaged to prepare the results shown in the drawing. Curve 1 is for the particle-loaded film and Curve 2 is for the control film. As may be seen, the flame-retardant-containing film of the invention maintained good charge level during this testing which extended for about one year.

The webs were also tested for resistance to flammability according to British and German test specifications, BS 3121 and DIN 51438 (a test sample is ignited and the length of charring along the sample is measured; if the length of charring is less than a specified amount, the sample is deemed to pass the test), and both Samples A and B passed the test.

What is claimed is:

1. A modified fibrous web electret comprising fibers fibrillated from a film comprising two or more layers that comprise nonpolar polymeric material, one of said layers being substantially free of particulate matter, and another layer including particulate material which can potentially increase the conductivity of the layer, said particulate material having an average diameter smaller than the thickness of the layer, and said web maintaining a high charge level even when kept in a high humidity environment.

2. A fibrous web of claim 1 in which said layers comprise polypropylene.

3. A fibrous web of claim 1 in which said included particulate material comprises an agent which increases the flame retardancy of the web.

4. A fibrous web of claim 3 in which said agent comprises a brominated derivative of bisphenol A.

5. A fibrous web of claim 3 in which said flame retardant agent comprises 2,2 bis[3,5-dibromo-4-(2,3-dibromopropoxy phenyl)]propane.

6. A modified fibrous web electret comprising fibers fibrillated from a film comprising a nonpolar polymeric material and 2,2 bis[3,5-dibromo-4-(2,3-dibromopropoxy phenyl)]propane dispersed in the polymeric material.

7. A fibrous web of claim 6 in which the nonpolar polymeric material comprises polypropylene.

* * * * *